INVENTORS
Norman Philip COX
Wallace James RITCHIE

ATTORNEY

Nov. 14, 1967     N. P. COX ETAL     3,352,105
FIREWALL ATTACHMENT

Filed Dec. 14, 1964     2 Sheets-Sheet 2

INVENTORS
Norman Philip COX
Wallace James RITCHIE

ATTORNEY

United States Patent Office 3,352,105
Patented Nov. 14, 1967

3,352,105
FIREWALL ATTACHMENT
Norman Philip Cox and Wallace James Ritchie, Greenfield Park, Quebec, Canada, assignors to United Aircraft of Canada Limited, Longueuil, Quebec, Canada
Filed Dec. 14, 1964, Ser. No. 418,157
3 Claims. (Cl. 60—39.11)

This invention relates broadly to aircraft and gas turbine engines used to power said aircraft, and specifically to the construction of a firewall suitable for use on gas turbine engines where there are no means of positively securing a usual sheet metal firewall to the engine.

As is known, in order to prevent the possible travel of flame from one portion of an engine to another, it is necessary to provide a solid substantially gasproof barrier or partition transversely of the axis of the engine so as to surround the engine. However, in view of the fact that some gas turbine engines are constructed as complete in-line units without exterior supporting framework it is difficult to attach such a partition or firewall securely on the exterior of the engine casing.

The present invention recognizes this problem and aims to provide a method of securely attaching such a firewall by furnishing a segmented firewall construction which is designed so as to be securely held in place by a clamping action about the engine casing. In accordance with the present invention the firewall consists of an annular assembly which is split into halves which have reinforced flanges along the split line. A return flange on the inside diameter provides a surface, adapted to surround an engine casing, and on which a flexible sealing strip is bonded.

The dimensions of the inside diameter of the firewall are such that when the two halves are joined along the split line by suitable bolts passing through the reinforced flanges, the firewall is retained in position on the engine by the clamping effect of the bolts, aided by the adhesion of the sealing strip to the casing of the engine.

Having thus generally described the nature of the invention, particular reference will be made to the accompanying drawings showing by way of illustration a preferred embodiment thereof, and in which.

Figures 1, 2, 3:
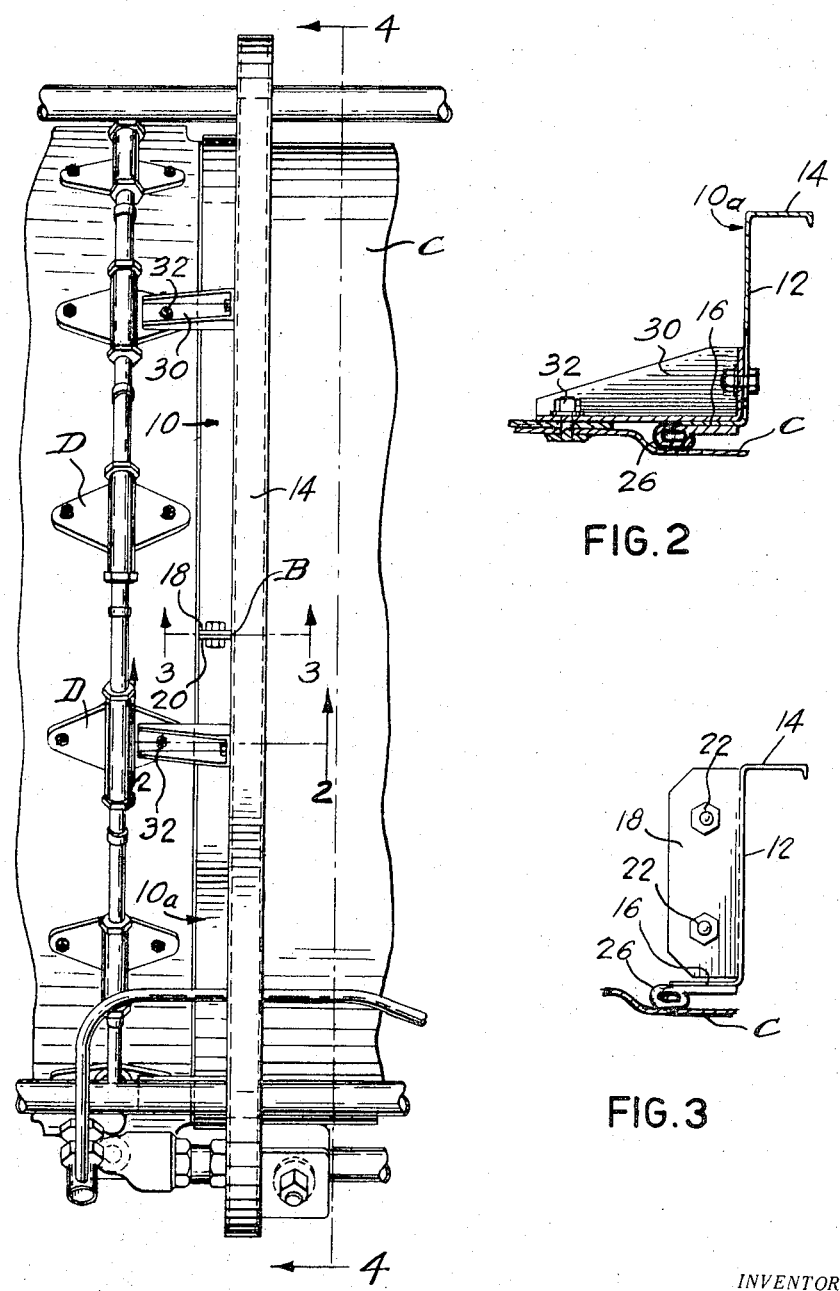
FIGURE 1 is a view in side elevation of a firewall construction in accordance with the invention as it would appear in operative position and on a gas turbine engine, the ring being mounted between the fuel injection end of a combustion chamber casing and an air inlet casing.
FIGURE 2 is a cross-sectional view of the construction shown in FIGURE 1 as seen along the line 2—2.
FIGURE 3 is a cross-sectional view of the construction of FIGURE 1 as seen along the line 3—3.
Figure 4:
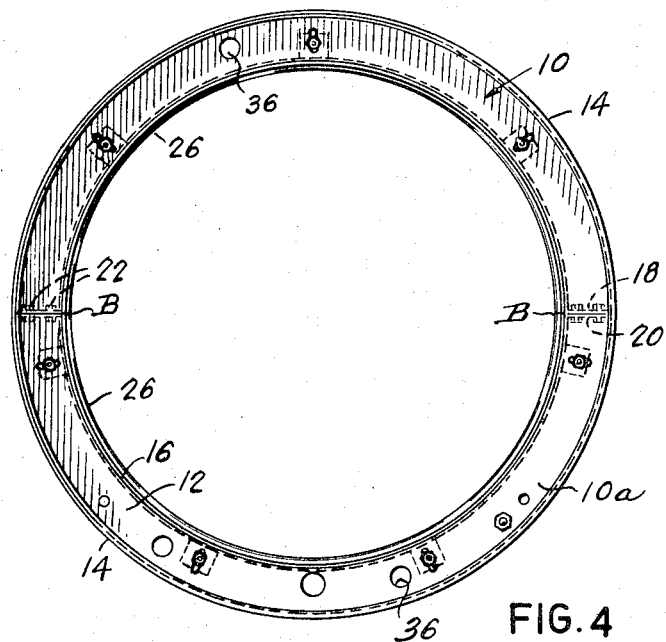
FIGURE 4 is a front view of the firewall construction as seen in the direction of the arrows 4—4 in FIGURE 1 with the engine construction deleted for clarity.
Figure 5:
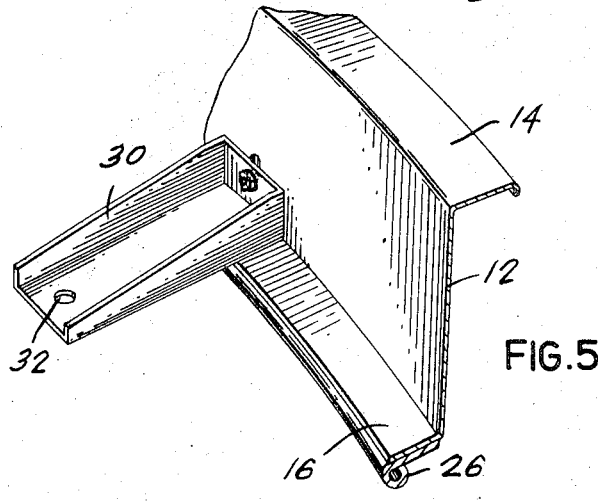
FIGURE 5 is an enlarged detail view in perspective elevation of the firewall section and associated bracket shown in FIGURE 2.

With particular reference to FIGURES 1 and 4 of the drawings, the firewall construction of the invention consists essentially of a pair of sheet metal segments 10, 10a which when combined form the complete firewall of annular formation. As shown most clearly in FIGURE 3 for example, the preferred construction of the segments 10, 10a include a main web 12, an outstanding outer flange 14 and a return flange 16 surrounding the inner periphery. The segments 10, 10a are each provided on their joining surfaces along the medium split line B with integral reinforced flanges 18, 20, which meet in abutting relationship and are joined by bolts 22 as shown. The return flange 16 provides a surface on which a sealing strip 26 is bonded as shown in FIGURES 2 and 3. The dimensions of the inside diameter of the combined segments 10, 10a are chosen so that when the two halves are joined along the split line B to form the complete firewall, the latter is retained in position about the exterior of the engine casing C by the clamping effect of the bolts 22, aided by the adhesion of the sealing strip 26 to the case C.

It will also be noted that, in the preferred construction shown, brackets 30 are adhesively bonded to the firewall at spaced apart intervals to aid in its location and fastening. Each of the brackets 30 include a pick-up hole 32 which, in the construction shown, is used to attach the brackets to certain of the mounting brackets D of a fuel injection system. These brackets 30 are not an essential part of the firewall proper and may be omitted if there is no convenient reference point of attachment (for example, the fuel system brackets D as shown). It will also be noted that the firewall construction shown is provided with several openings 36 about the main web 12. These, in the construction illustrated, are to permit passage of various tubes and conduit forming part of the particular engine assembly shown and will be varied, or in some cases omitted, depending on the engine construction to which the firewall is attached.

We claim:

1. A firewall assembly for use in combination with a gas turbine engine having an engine casing of cylindrical formation, the assembly comprising:

a main firewall body made up of at least two interconnected circumferentially extending segments supported solely by said engine casing, each of said segments having a main fire resistant web extending in a radial plane of said engine, connecting flanges extending axially outwardly from each end of said web disposed in abutting relationship with the corresponding flanges of adjacent segments, a return flange about the inner periphery of each of said segments extending axially in the plane of said engine casing, a separate resilient sealing strip secured to each of said return flanges, said sealing strip lying substantially within the boundaries of said return flange, said resilient sealing strip provided with an axially extending portion in the plane of said engine casing, said axially extending portion terminating at one end in a bulbous portion, and adjustable retaining means passing through each abutting pair of said segment connecting flanges, whereby said firewall assembly is attached solely to said engine casing, and such attachment being effectable wholly by adjustment of said retaining means to draw said segments tightly about said engine casing by reducing the internal diameter of said interconnected segments, drawing said sealing strips into sealing contact with said engine casing, said fire resistant web, said return flange and said sealing strip each being circumferentially continuous and forming on said engine casing a circumferentially continuous assembly.

2. A firewall assembly as claimed in claim 1 further comprising right angled brackets distributed circumferentially around said web and each having a radial arm secured to said web and an axial arm secured to said casing.

3. In combination with a gas turbine engine having an engine casing of cylindrical formation, the assembly comprising:

a main firewall body made up of at least two interconnected circumferentially extending segments supported solely by said engine casing, each of said segments having a main fire resistant web extending in a radial plane of said engine, connecting flanges extending axially outwardly from each end of said web disposed in abutting relationship with the corresponding flanges of adjacent segments, a return flange about the inner periphery of each of said segments extending axially in the plane of said engine casing, a separate resilient sealing strip secured to each of said return flanges, said sealing strip lying substantially within the boundaries of said return flange, said resilient sealing strip provided with an axially extending portion in the plane of said engine casing, said axially extending porton terminating at one end in a bulbous portion, and adjustable retaining means passing through each abutting pair of said segment connecting flanges and adjusted to draw said segments tightly about said engine casing by reducing the internal diameter of said interconnected segments, drawing said sealing strips into sealing contact with said engine casing, so as to allow said firewall assembly to be easily connected to, and solely supported by said engine casing, said fire resistant web, said return flange and said sealing strip each being circumferentially continuous and forming on said engine casing a circumferentially continuous assembly.

References Cited

UNITED STATES PATENTS

| | | | |
|---|---|---|---|
| 676,246 | 6/1901 | Frick | 285—237 |
| 773,734 | 11/1904 | Griffiths | 285—368 |
| 1,037,554 | 9/1912 | Shoemaker | 285—363 |
| 1,399,748 | 12/1921 | Cheney | 285—42 X |
| 1,966,341 | 7/1934 | Galbraith | 138—148 |
| 2,630,678 | 3/1953 | Pratt | 60—39.11 X |
| 2,986,878 | 6/1961 | Townsend | 60—39.11 |

FOREIGN PATENTS 314,638  10/1919  Germany.

CARL W. TOMLIN, *Primary Examiner.*

D. W. AROLA, *Assistant Examiner.*